(12) United States Patent
Vermeersch

(10) Patent No.: US 7,971,502 B2
(45) Date of Patent: Jul. 5, 2011

(54) ASSEMBLY WITH METAL CASTING AND POLYMERIC MEMBER AND TRANSMISSION SHIFT MECHANISM INCLUDING SAME

(75) Inventor: Michael C. Vermeersch, Saginaw, MI (US)

(73) Assignee: Nexteer (Beijing) Technology, Co., Ltd.

( * ) Notice: Subject to any disclaimer, the term of this patent is extended or adjusted under 35 U.S.C. 154(b) by 399 days.

(21) Appl. No.: 11/586,132

(22) Filed: Oct. 25, 2006

(65) Prior Publication Data
US 2008/0098841 A1 May 1, 2008

(51) Int. Cl.
*B60K 20/06* (2006.01)
(52) U.S. Cl. .................................................. 74/473.31
(58) Field of Classification Search ............... 74/473.33, 74/473.34, 473.1, 473.14, 473.15, 473.3, 74/473.31, 473.32; 403/122, 123, 124, 125, 403/126, 127, 128, 129, 130, 131, 132, 133, 403/134, 135, 136, 137, 138, 139, 140, 141, 403/142, 143, 144
See application file for complete search history.

(56) References Cited

U.S. PATENT DOCUMENTS

| | | | | |
|---|---|---|---|---|
| 2,478,056 A | * | 8/1949 | Reeg | ............................. 384/212 |
| 3,902,209 A | * | 9/1975 | Gohs | ............................... 470/42 |
| 4,062,395 A | | 12/1977 | Sirmay | |
| 4,377,197 A | | 3/1983 | Oxenreider et al. | |
| 4,446,214 A | | 5/1984 | Mocas | |
| 4,453,300 A | * | 6/1984 | Klimek et al. | ............ 29/888.044 |
| 4,539,246 A | | 9/1985 | Landphair et al. | |
| 4,548,254 A | | 10/1985 | Roberts | |
| 4,733,573 A | * | 3/1988 | Kramer | ....................... 74/473.31 |
| 5,028,163 A | * | 7/1991 | Krieg et al. | .................... 403/131 |
| 5,195,571 A | | 3/1993 | Morgan et al. | |
| 5,251,683 A | | 10/1993 | Backer | |
| 5,560,252 A | * | 10/1996 | Nishigai et al. | ............ 74/473.36 |
| 5,595,234 A | | 1/1997 | Beck | |
| 5,896,778 A | * | 4/1999 | Murakami et al. | ......... 74/473.34 |
| 6,055,881 A | * | 5/2000 | Oda | ........................... 74/473.31 |
| 6,152,641 A | | 11/2000 | Rabe | |
| 6,615,900 B2 | | 9/2003 | Takahashi | |
| 6,698,963 B1 | * | 3/2004 | Parker et al. | ................... 403/130 |
| 7,077,432 B2 | * | 7/2006 | Manwaring et al. | ........... 280/777 |
| 2003/0140723 A1 | | 7/2003 | Zimmermann | |
| 2004/0173988 A1 | * | 9/2004 | Britton et al. | .................. 280/204 |
| 2009/0003927 A1 | * | 1/2009 | Howes et al. | ................... 403/131 |

OTHER PUBLICATIONS

FisherCast Global Corporation, Promotional Website Materials (3 pages), (http://www.fishercast.com), Date Unknown, FisherCast Global Corporation, Peterborough, Ontario, Canada.
FisherCast Global Corporation, Promotional Website Materials (15 pages), (http://fishercast/quidnovis.org), 2006, FisherCast Global Corporation, Peterborough, Ontario, Canada.
U.S. Appl. No. 11/788,255 entitled Transmission Shift Mechanism Having Insert Molded Crank Arm, filed Apr. 19, 2007, Inventor: Michael C. Vermeersch.

* cited by examiner

*Primary Examiner* — Thomas R Hannon
*Assistant Examiner* — Phillip A Johnson
(74) *Attorney, Agent, or Firm* — Cantor Colburn LLP

(57) ABSTRACT

An assembly including a polymeric member and a unitary metal casting wherein the metal casting relatively moveably captures the polymeric member on the metal casting. The assembly can be adapted for use as a crank arm in a transmission shift mechanism. In some embodiments of the assembly, the polymeric member includes an opening defining a rotational axis of said polymeric member. The metal casting extends into the opening and includes at least one enlarged diameter portion with the polymeric member being rotationally disposed on the metal casting and axially captured on the metal casting by the at least one enlarged diameter portion of the metal casting. A method of manufacture is also disclosed.

10 Claims, 3 Drawing Sheets

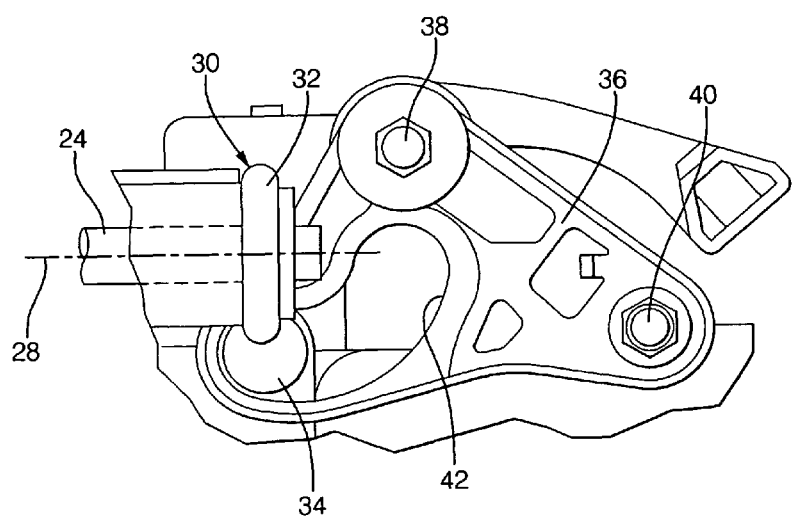
FIG. 2
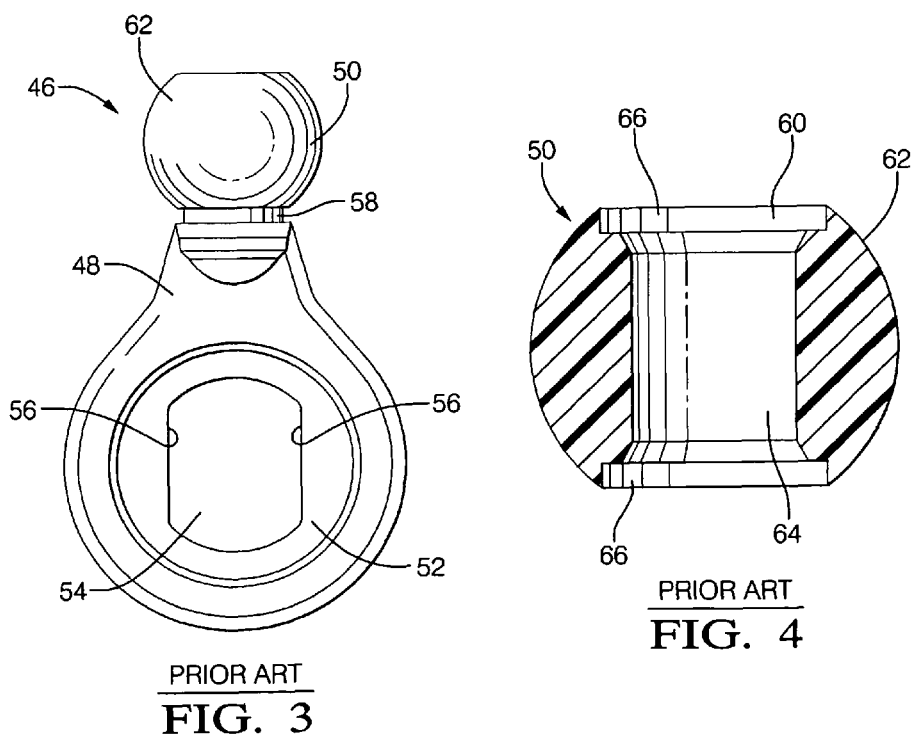
PRIOR ART
FIG. 3
PRIOR ART
FIG. 4

ASSEMBLY WITH METAL CASTING AND POLYMERIC MEMBER AND TRANSMISSION SHIFT MECHANISM INCLUDING SAME

BACKGROUND OF THE INVENTION

1. Field of the Invention

The present invention relates to an assembly including a metal casting and a polymeric member and, more particularly, such an assembly that is suitable for use in a transmission shift mechanism for a vehicle.

2. Description of the Related Art

Vehicles having an automatic transmission oftentimes have a shift lever mounted on the steering column of the vehicle. Many of these shift mechanisms have an actuator-driving crank arm that includes an arm portion component with a ball component mounted on the arm portion to provide the crank arm with a substantially spherically-shaped ball end. In some known mechanisms, the ball component of the crank arm is rotatable relative to its arm portion component while in other known mechanisms, the ball component is fixed to the arm portion and cannot rotate relative to the arm portion.

In such known mechanisms, the ball component is often disposed within an arcuate cam slot opening located on a pivoting actuator. Rotational movement of the crank arm moves the actuator between various positions about its pivot point. One end of a cable or linkage is attached to the actuator with the other end being attached to the gear selector of the transmission of the vehicle so that movement of the cable effects transmission gear selection.

The arm portion of the crank arm is typically steel, and requires machining to form the crank arm from extruded bar stock to control size tolerance and material consistency. The arm portion of such typical crank arms is generally manufactured from a steel rod in a progressive, cold forming stamping process that requires several separate forming and/or machining operations to yield the arm portion.

In a subsequent metal forming operation, the ball component of the crank arm is then attached, typically by being staked onto the stamping that forms the arm portion. Generally, the staking process will fix the ball on the crank arm in a manner that does not allow the ball to rotate relative to the crank arm. The assembly process whereby the ball component is assembled to the arm portion can produce scrap from over/under staking. Additionally, the staking of the ball sometime produces inconsistent positional tolerances and/or results in failure due to ball separation.

The arm portion requires selective orientation at the next level of assembly wherein the crank arm is attached to its rotatable shift shaft. The ball component is typically a self-lubricating plastic that has a shape formed by a machining process. When staking the ball component on the arm portion to non-rotationally fix the ball on the crank arm, the rotational position of the ball component is generally not controlled and, thus, the entire exterior surface of the ball must be precisely formed, even though in operation a substantial portion of the ball exterior surface may never engage a surface of the actuator cam opening.

The use of a staking process that fixes the ball component on the arm portion component without allowing the ball to rotate will generally be less expensive than attaching the ball component to the arm portion in a manner that allows the ball to rotate relative to the arm portion. For example, it is known to use a shoulder bolt to rotatably attach a ball component. Ball components used to manufacture crank arms using a staking process are generally formed by machining an extruded plastic material. By machining an extruded plastic material to form the ball, the dimensions of the ball can be controlled. Moreover, a ball formed by machining an extruded plastic material will have greater strength than a similar ball formed by injection molding. The differential cooling of an injection molded ball component will oftentimes reduce the strength of the ball near its exterior surface which, when non-rotatably staked to the arm portion, is in sliding engagement with the cam slot. Although the machining of extruded plastic material to form a ball component is generally more expensive than injection molding a ball component, injection molded ball components typically do not have the strength necessary to provide a durable and reliable product when placed in sliding engagement with the camming slot. Thus, the ball component must typically be formed using the relative more expensive process of machining an extruded material.

Accommodating the manufacturing and assembly-related factors of known shift mechanism crank arms make such crank arms undesirably expensive.

SUMMARY OF THE INVENTION

The present invention provides an assembly having a polymeric member moveably coupled with a metal casting and which can be adapted for use as a crank arm in a transmission shift mechanism.

The invention comprises, in one form thereof, an assembly including a polymeric member and a unitary metal casting wherein the metal casting relatively moveably captures the polymeric member on the metal casting.

In some embodiments of the assembly, the polymeric member includes an opening defining a rotational axis of the polymeric member. The metal casting extends into the opening and includes at least one enlarged diameter portion with the polymeric member being rotationally disposed on the metal casting and axially captured on the metal casting by the at least one enlarged diameter portion of the metal casting.

In some additional embodiments of the assembly, the polymeric member includes an opening that includes a central cylindrical portion and first and second end portions having diameters greater than the central cylindrical portion. The first and second end portions are disposed proximate opposite ends of the opening and the metal casting substantially fills the central cylindrical portion and the first and second end portions of the opening whereby the polymeric member is rotatably disposed and axially captured on the metal casting.

The invention comprises, in another form thereof, a transmission shift mechanism for use with a vehicle transmission. The transmission shift mechanism includes a user-operated selector and a sub-assembly operably disposed between the user-operated selector and the vehicle transmission. The sub-assembly includes a polymeric member having an exterior engagement surface engaged with the transmission shift mechanism. The subassembly also includes a unitary metal casting securable to the transmission shift mechanism. The metal casting is engaged with the polymeric member and relatively moveably captures the polymeric member on the metal casting.

The invention comprises, in still another form thereof, a method of manufacture. The method includes providing a polymeric member, placing the polymeric member in a mold, and casting a metal material within the mold wherein the cast metal material relatively moveably couples the polymeric member with the cast metal material.

In some embodiments of the method, the polymeric member is formed by injection molding. In still other embodiments, the polymeric member is provided with an opening defining a rotational axis of the polymeric member, the step of casting the metal material rotationally disposes and axially captures the polymeric member on the metal cast material. Further, the metal cast material and polymeric member are installed in a vehicular transmission shift mechanism wherein the metal cast material is pivotally secured to the transmission shift mechanism and the exterior surface of the polymeric member is engaged with the transmission shift mechanism, the rotational axis of the polymeric member being disposed substantially perpendicular to the pivot axis defined by the metal cast material.

An advantage of the present invention is that it provides a relatively efficient manufacturing process for creating an assembly having a polymeric member that is moveably coupled with a cast metal member.

Another advantage is that it provides a robust sub-assembly for use in a transmission shift mechanism that can be relatively inexpensively manufactured and which facilitates the efficient assembly of the transmission shift mechanism.

BRIEF DESCRIPTION OF THE DRAWINGS

The above mentioned and other features of this invention, and the manner of attaining them, will become more apparent and the invention itself will be better understood by reference to the following description of an embodiment of the invention taken in conjunction with the accompanying drawings, wherein:

FIG. 2 is an enlarged view of a portion of the transmission shift mechanism shown in FIG. 1.

FIG. 3 is a view of a prior art crank arm for a transmission shift mechanism.

FIG. 4 is a cross sectional view of the ball portion of the crank arm of FIG. 3 taken through the center of the ball portion.

Figure 1:
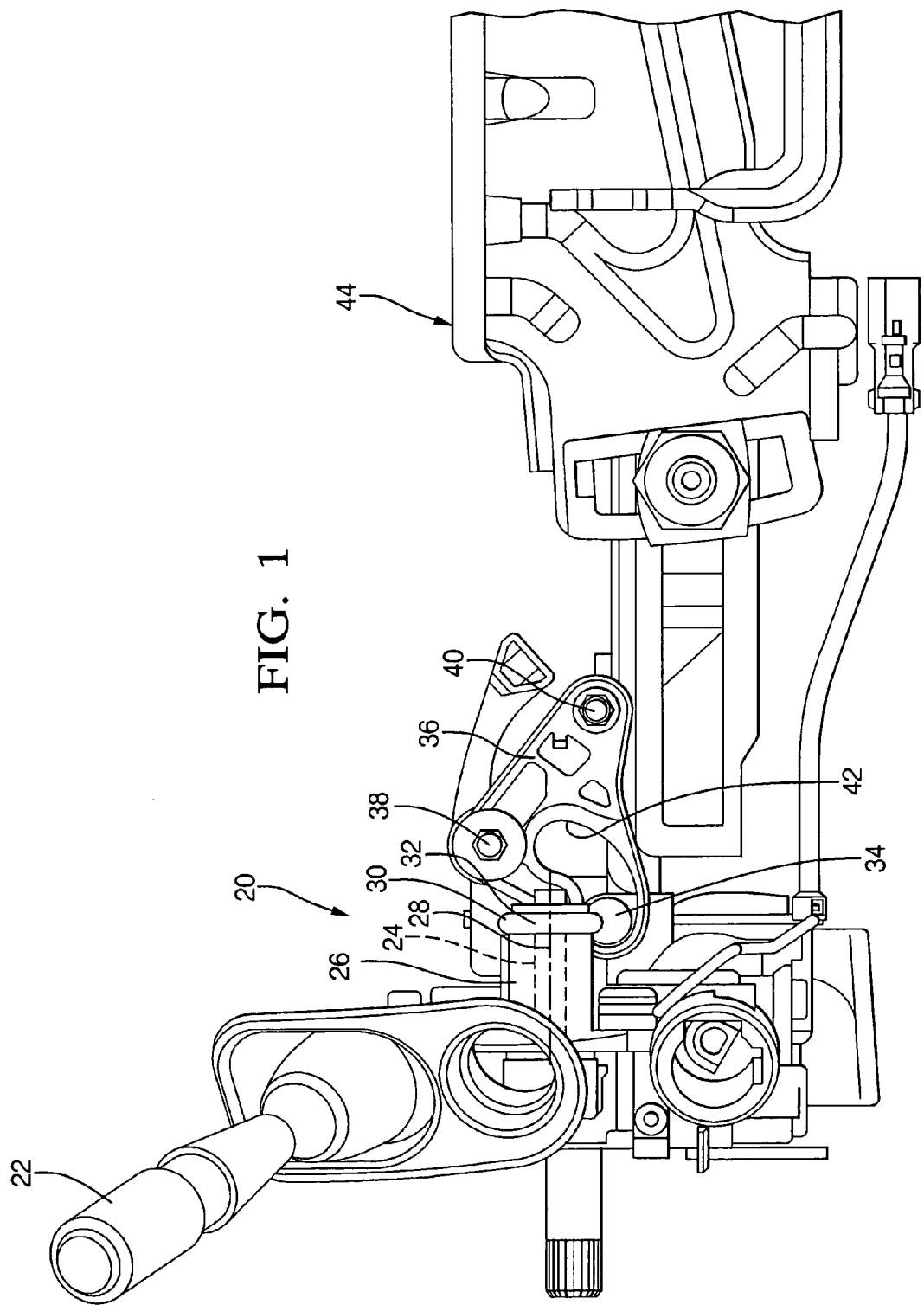
FIG. 1 is a view of a portion of a steering column with a transmission shift mechanism mounted thereon.

Corresponding reference characters indicate corresponding parts throughout the several views. Although the exemplification set out herein illustrates embodiments of the invention, in several forms, the embodiments disclosed below are not intended to be exhaustive or to be construed as limiting the scope of the invention to the precise forms disclosed.

DETAILED DESCRIPTION OF THE INVENTION

An automatic transmission shift mechanism 20 is depicted in FIGS. 1 and 2. Shift mechanism 20 includes a driver-operated shift lever 22 for selection of one of the gears or gear arrangements of the automatic transmission, e.g., park-reverse-neutral-drive-low (PRNDL). Lever 22 is coupled to a rotatable shift shaft 24 which extends through housing 26 and defines an axis 28. Crank arm 30 is rotatably fixed to shift shaft 26. Movement of lever 22 rotates shift shaft 24 and thereby rotates or pivots crank arm 30 about axis 28 through a defined range of motion.

Crank arm 30 includes a crank arm component 32 and a ball component 34. Crank arm 30 is coupled with actuator 36 via ball component 34. Actuator 36 is rotatably attached at pivot point 38 to housing 26 and includes an attachment member 40. A cable or linkage (not shown) is attached at one end to attachment member 40 and is attached at its other end to the gear selector of a vehicle transmission (not shown).

Actuator 36 also includes an arcuate camming slot 42 in which ball component 34 is disposed. Movement of lever 22 rotates both shift shaft 24 and attached crank arm 30 thereby causing ball component 34 to move through an arc. As ball component 34 moves, it forcibly engages camming slot 42 and pivots actuator 36 about its pivot point 38. The pivoting movement of actuator 36 and attachment member 40 results in the changing of the gear of the vehicle transmission via the cable or linkage (not shown) secured to both attachment member 40 and the gear selector of the transmission (not shown). The illustrated shift mechanism 20 is mounted on a steering column assembly 44.

Except for crank arm 30, which is discussed in greater detail below, the above-described operation and structure of shift mechanism 20 is well known in the art. FIGS. 3 and 4 illustrate a prior art crank arm 46. The use of crank arm 46 with shift mechanism 20 is well known in the art.

Prior art crank arm 46 includes an arm component 48 and a ball component 50. Arm component 48 is formed from a steel rod or other suitable material in a progressive cold stamping operation and includes a thin generally planar portion 52. A slug is punched from planar portion 52 to form aperture 54 having flats 56. Shift shaft 24 is inserted through aperture 54 and engages flats 56 when securing crank arm 46 to shift mechanism 20. Aperture 54 is provided with a chamfer along its edge on one side of planar portion 52 to ease assembly of the crank arm 46 on the shift shaft 24. Punch tolerances prevent the chamfer from being formed on both sides of planar portion 52 and, consequently, crank arm 46 must be properly oriented with regard to the single chamfered side of crank arm 46 when securing crank arm 46 to shift shaft 24.

Arm component 48 also includes a generally cylindrical post 58 on which ball component 50 is mounted. Post 58 is inserted through opening 60 in ball 50 and its end is staked to secure ball 50 on arm component 48. Ball component 50 is formed by extruding a polymeric material, e.g., acetal, and then machining the material to form the substantially spherical exterior surface 62 and opening 60 of ball 50.

Opening 60 has a central cylindrical section 64 and cylindrical counterbores 66 at opposite ends of opening 60. The staking operation deforms the distal end of post 58 such that the deformed portion fills the distal counterbore 66 of opening 60 to attach ball component 50 to arm component 48. The staking attachment of ball 50 on post 58 fixes ball 50 to post 58 in a manner that does not allow ball 50 to rotate. The more complex, and thus expensive, use of a shoulder bolt to attach ball 50 would allow ball 50 to rotate. In either case, because the rotational orientation of ball 50 is not controlled during the staking operation, the exterior surface 62 of ball component 50 must be machined to close tolerances for its full circumference to provide an acceptable level of rolling or sliding engagement with camming slot 42. Not only must the arm and ball components 48, 50 meet their respective tolerances, but the deformation and cracking of ball component 50 must be prevented during the staking operation. As will be understood by a person having ordinary skill in the art, the proper operation and durability of shift mechanism 20 is highly sensitive to the process by which prior art crank arm 46 is manufactured and assembled.

Figure 5:
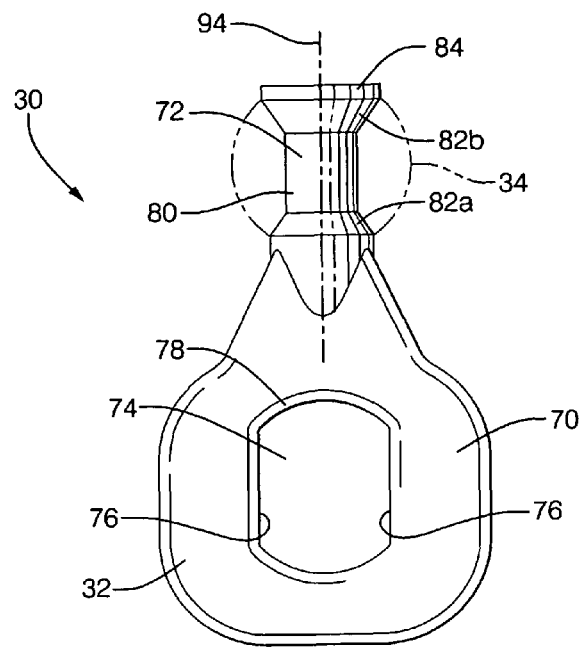
FIG. 5 is a view of a crank arm in accordance with the present invention.
Figure 6:
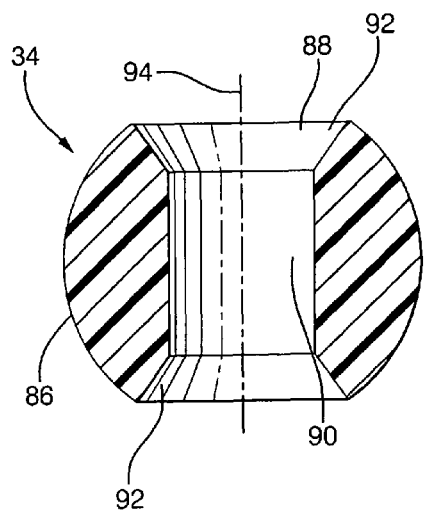
FIG. 6 is a cross sectional view of the ball portion of the crank arm of FIG. 5 taken through the center of the ball portion.

Turning now to FIGS. 5 and 6, a crank arm 30 in accordance with the present invention is shown in greater detail. Crank arm 30 is an assembly of a metal cast component 32 and a polymeric member 34. As mentioned above, assembly 30 is a sub-assembly of transmission shift mechanism 20 operably disposed between the user-operated selector 22, which in the embodiment illustrated in FIG. 1 is a steering column mounted shift lever, and actuator 36 which, in turn, is operably coupled to the vehicle transmission (not shown) via a cable or other suitable linkage (not shown).

Polymeric member 34 may be formed out of any suitable plastic material and, in the illustrated embodiment, is formed by an injection molding process using an acetal material. Advantageously, the polymeric material used to form member 34 is a self-lubricating material. Self-lubricating polymeric materials which may be suitable for one or more of the various alternative embodiments of the present invention include acetal, nylon, polytetrafluoroethylene (PTFE) available under the trademark Teflon, ultra high molecular weight polyethylene (UHMWPE), and other suitable materials known to those having ordinary skill in the art.

As best seen in FIG. 6, polymeric member 34 has an exterior engagement surface 86 which defines a substantially spherical body 34. The shape of member 34, however, differs from that of a sphere at the opposing ends of opening 88 which extends through member 34. Opening 88 includes a central cylindrical portion 90 and first and second end portions 92. End portions 92 are flared and have a diameter that increases in size as end portions progress radially outwardly from the center of polymeric member 34. The diameter of end portions 92 is larger than the diameter of central portion 90 to provide for the capture of polymeric member 34 on metal casting 32. Both polymeric member 34 and opening 88 extending through polymeric member are symmetric about central axis 94.

Polymeric member 34 is rotationally disposed on metal casting 32 and when crank arm 30 is installed in transmission shift mechanism 20, exterior surface 86 is rollingly engaged with actuator 36. In the illustrated embodiment, polymeric member 34 is rotatably disposed in non-linear camming slot 42 with axis 94 defining the rotational axis of polymeric member 34.

Polymeric member 34 is captured on unitary metal casting 32 which is best seen in FIG. 5. As used herein a "unitary" metal casting refers to a metal casting that is formed by cooling a single mass of molten or semi-molten metal material. Mechanically fastening, welding or adhering to metal castings rigidly together would be an assembly of metal castings rather than a unitary metal casting. Such a unitary metal casting could then be rigidly or moveably secured or coupled to other metallic or non-metallic parts to form a larger assembly or sub-assembly.

In the illustrated embodiment, metal casting 32 is formed out of a zinc alloy. Other suitable metal materials, however, may also be used to form metal casting 32. The illustrated metal casting 32 includes a generally planar or flat arm portion 70 and a post portion 72. Arm portion 70 defines an aperture 74 having flats 76 and a chamfer 78 along the entire outer circumference of aperture 74 on both sides of arm portion 70. Chamfer 78 facilitates the assembly of metal casting 32 onto shift shaft 24 and providing a chamfer 78 on both sides of arm portion 70 eliminates the need to directionally position the opposite sides of flat arm portion 70 during assembly. Post portion 72 has a shape corresponding to opening 88 with a central cylindrical portion 80, a proximal flared portion 82a and a distal flared portion 82b. A small distal cylindrical portion 84 of post portion 72 projects outwardly from opening 88 and is an artifact of the manufacturing process.

Flat arm portion 70 is secured to shift mechanism 20 by inserting the end of shift shaft 24 through aperture 74. Flats on shift shaft 24 are engaged with flats 76 so that crank arm 30 pivots about axis 28 as shift shaft 24 is rotated about axis 28 by the movement of shift lever 22. Polymeric member 34 is moveably captured on post portion 72 of metal casting 34 and, in the installed position depicted in FIGS. 1 and 2, the pivot axis 28 of metal casting 32 is positioned substantially perpendicular to the rotational axis 94 of polymeric member 34 defined by opening 88.

In the illustrated embodiment, metal casting 32 substantially fills cylindrical portion 90 and first and second end portions 92 of opening 88. As a result, polymeric member 34 is both rotatably disposed on post portion 72 and axially captured between flared portions 82a and 82b. Flared portions 82a, 82b are located proximate opposite ends of opening 88 with distal flared portion 82b preventing the non-destructive removal of polymeric member 34 from metal casting 34. Distal flared portion 82b thereby captures polymeric member 34 on metal casting 32.

Figure 7:
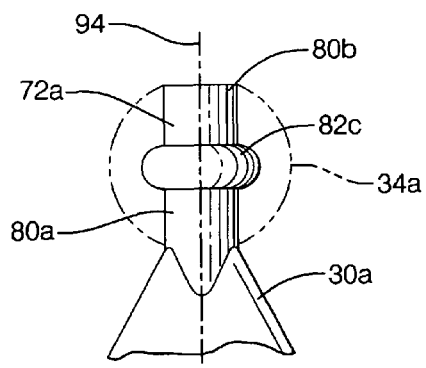
FIG. 7 illustrates an alternative embodiment of the crank arm.

An alternative configuration of the interface between the metal casting and polymeric member is illustrated in FIG. 7. In the embodiment 30a of FIG. 7, polymeric member 34a (shown in dashed outline) is rotatably disposed and axially captured on a post portion 72a of a metal casting. Assembly 30a can be used in transmission shift mechanism 20 and functions the same as assembly 30 in mechanism 20. Polymeric member 34a includes a cylindrical opening that extends through the center of the generally spherical polymeric member 34a and has an enlarged diameter portion proximate the center of the polymeric member 34a. The corresponding metal casting substantially fills the opening in polymeric member 34a and includes a proximal cylindrical portion 80a, a distal cylindrical portion 80b and an enlarged diameter portion 82c having a rounded profile. The rotatable bearing engagement between the polymeric member and the metal casting is facilitated by the use of cylindrical portions 80a, 80b. Enlarged diameter portion 82c axially captures polymeric member 34a on the metal casting and in further modifications of the assembly may take different shapes including a generally spherical shape or a cylindrical disk shape. Polymeric member 34a may be formed by injection molding to define the exterior shape and central cylindrical opening of member 34a with the enlarged diameter portion of the opening being machined in polymeric member 34a subsequent to the injection molding process and prior to the casting of the metal material. The use of an enlarged diameter portion 82c in a central location of the opening in polymeric member 34a allows the single enlarged diameter portion 82c to axially capture polymeric member 34a on the metal casting. Although illustrated capturing elements 82a, 82b and 82c are all located within an opening in a polymeric member, this is not a requirement. For example, if flared portions 82a and 82b were replaced by an extension of cylindrical portion 80 in assembly 30, distal portion 84 could be diametrically enlarged to thereby capture polymeric member 34 on metal casting 34 between portion 84 and flat arm portion 70 both of which would bear against the exterior surface of polymeric member 34 proximate opposite ends of opening 88 to prevent the non-destructive removal of polymeric member 34 from metal casting 32.

Various other configurations of opening 88 and post portion 72 may also be used to moveably capture polymeric member 34 on metal casting 32. For example, in alternative applications, it might be desirable to elongate the distance between flared portions 82a, 82b to allow polymeric member 34 to both rotate and slide on post portion 72. In yet other applications, opening 88 and an elongated central portion 80 of post portion 72 could be provided with similar non-circular cross-sections to non-rotatably and slidably capture polymeric member 34 on metal casting 32.

Assembly 30 can be manufactured in a relatively inexpensive and efficient manner. In the illustrated embodiment, polymeric member 34 is an acetal material and is formed using a conventional injection molding process. Polymeric member 34 does not require any machining after being formed by the injection molding process. In other words, the configuration of polymeric member 34 when it is installed in transmission shift mechanism 20 is substantially the same as the configuration of polymeric member 34 produced by the injection molding process.

Polymeric member 34a is also formed using an injection molding process, however, it is subjected to a later machining operation to form a groove to receive and define enlarged diameter portion 82c of the metal casting. Although polymeric member 34a does not totally eliminate the use of machining processes to form member 34a, the ability to manufacture member 34a by an injection molding process followed by only minimal machining provides a significant cost savings when compared to the much greater machining required to form a similar member from an extruded material.

The use of an injection molding process is facilitated by rotatably mounting polymeric member 34 on metal casting 32. This rotatable mounting of polymeric member 34 on metal casting 32, allows polymeric member 34 to rotate within camming slot 42 and thereby be in rolling engagement with camming slot 42 as metal casting 32 is pivoted. In contrast, a non-rotatably fixed ball component 50 will slide within camming slot 42. The sliding engagement of ball component 50 creates higher stresses within ball component 50 than the stresses created by the rolling engagement of polymeric member 34. To satisfy these strength demands, ball component 50 is formed by extruding an acetal material and then machining the material to form ball component 50. This extrusion and machining process produces a ball component with greater internal strength proximate exterior surface 62 than an injection molding process because of the effects of differential cooling that accompany the use of an injection molding process when forming an article having the shape of ball component 50. Generally, the injection molding of a part having the general shape of either ball component 50 or polymeric member 34 will result in a part that has its greatest material strength properties at its core and has its weakest properties at its exterior surface.

The use of an injection molding process to form a ball component 50 that cannot rotate about post 58 and must slide against camming slot 42 may lead to an unacceptably high failure rate of ball component 50. By rotatably mounting polymeric member 34 on metal casting 32 and allowing polymeric member 34 to rollingly engage camming slot 42, the stresses imposed on polymeric member 34 are reduced sufficiently to enable the use of an injection molded part. As described above, the ability to use an injection molded part is advantageous because it is considerably less expensive to form polymeric member 34 by injection molding than to form ball component 50 by an extrusion and machining process. Additionally, the use of a rotatable polymeric member 34 in shift mechanism 20 is advantageous because it reduces wear on polymeric member 34, reduces the drag and shifting effort thereby providing an improved feel, and provides a greater range of material and manufacturing options for producing polymeric member 34.

After forming polymeric member 34 with opening 88 therein, polymeric member 34 is placed in a mold, e.g., a die. A molten or semi-molten metal material is then introduced into the mold and allowed to cool to thereby form metal casting 32. When the molten metal material is introduced into the mold, it fills opening 88 to couple the resulting metal casting 32 with polymeric member 34. As the molten metal material cools to form metal casting 32, it shrinks thereby providing the clearance between post portion 72 and opening 88 necessary to allow polymeric member 34 to rotate on post portion 72.

The illustrated embodiment employs a zinc alloy to form metal casting 32 with an acetal member 34 to provide an acceptable clearance between metal casting 32 and polymeric member 34 to rotatably capture member 34 on casting 32. The zinc die casting alloy used to form metal casting 32 is advantageously ACuZinc, a zinc alloy that has a relatively low coefficient of friction. The casting of the metal material to form casting 32 may be done in Injected Metal Assembly (IMA™) equipment available from FisherCast Global Corporation having a place of business at 310 Armour Road, Peterborough, Ontario, Canada K9J 6Y9. The quick cycle times obtainable with the use of a zinc alloy in such a process permits the forming of metal casting 32 without impairing the functionality of the polymeric member.

The use of a die casting process to form metal casting 32 eliminates the need to use a machining, stamping or cold forming process in the manufacture of metal casting 32. Not only does the use of die casting eliminate the need to use such processes to form the general shape of metal casting 32, but no machining, stamping or cold forming process is required after metal casting 32 is removed from the die. In other words, metal casting 32 can be installed in transmission shift mechanism 20 in substantially the same configuration as when it was removed from the die. It also provides a wide range of shape options for metal casting 32. For example, die casting metal component 32 facilitates the use of a component 32 which has a symmetrical design thereby facilitating the installation of the metal casting into a larger assembly. Machined and otherwise manufactured parts can also be provided in symmetrical shapes, however, the designer will often be confronted with the trade-off between machining both sides of a part or machining a single side and requiring the part to be positionally oriented when installing it in a larger assembly. Additionally, the corners and transitions of a die cast part can often be shaped to reduce the stress concentrations at such points in comparison to parts formed by machining, stamping or similar processes.

While this invention has been described as having an exemplary design, the present invention may be further modified within the spirit and scope of this disclosure. This application is therefore intended to cover any variations, uses, or adaptations of the invention using its general principles.

What is claimed is:

1. A crank arm assembly for a column shift assembly comprising:
   a polymeric member, said polymeric member having a substantially spherical exterior surface, a rotational axis and a cylindrical opening that extends through said polymeric member along said rotational axis; and
   a unitary metal casting comprising said crank arm and having a generally planar arm portion and a post portion, said post portion engaged with and relatively moveably and axially capturing said polymeric member on said post portion, said post portion having an enlarged diameter portion proximate the center of the polymeric member, a proximal cylindrical portion extending toward and attached to said arm portion and a distal cylindrical portion extending away from said enlarged diameter portion and said proximal cylindrical portion along said rotational axis, said generally planar arm portion having an aperture for engaging a rotatable shift shaft.

2. The assembly of claim 1 wherein said polymeric member comprises a self-lubricating polymeric material.

3. The assembly of claim 2 wherein said polymeric member comprises an acetal material.

4. The assembly of claim 1 wherein said generally planar arm portion comprises a first side and a second side, and said aperture has a chamfer surrounding said aperture on each of said first side and said second side.

5. The assembly of claim 1, wherein said metal casting comprises a zinc alloy.

6. A transmission shift mechanism for use with a vehicle transmission comprising:
   a user-operated selector; and
   a crank arm sub-assembly operably disposed between said user-operated selector and the vehicle transmission, said crank arm sub-assembly comprising:
   a polymeric member having an exterior engagement surface engaged with said transmission shift mechanism, said polymeric member having a substantially spherical exterior surface, a rotational axis and a cylindrical opening that extends through said polymeric member along said rotational axis; and
   a unitary metal casting comprising a crank arm, said crank arm having a generally planar arm portion and a post portion, said metal casting engaged with said polymeric member and relatively moveably and axially capturing said polymeric member on said post portion, said post portion having an enlarged diameter portion proximate the center of the polymeric member, a proximal cylindrical portion attached to said arm portion and a distal cylindrical portion extending away from said enlarged diameter portion and said proximal cylindrical portion along said rotational axis, said generally planar arm portion having an aperture for engaging a rotatable transmission shift mechanism.

7. The transmission shift mechanism of claim 6 wherein said generally planar portion is pivotally secured to the transmission shift mechanism about a pivot axis disposed substantially perpendicular to said rotational axis of said polymeric member.

8. The transmission shift mechanism of claim 6 wherein said polymeric member is rotatably disposed within a non-linear camming slot defined by said transmission shift mechanism.

9. The assembly of claim 6 wherein said generally planar arm portion comprises a first side and a second side, and said aperture has a chamfer surrounding said aperture on each of said first side and said second side.

10. The transmission shift mechanism of claim 6, wherein said metal casting comprises a zinc alloy.

\* \* \* \* \*